US012581408B2

(12) United States Patent
Li et al.

(10) Patent No.: US 12,581,408 B2
(45) Date of Patent: Mar. 17, 2026

(54) SYSTEMS AND METHODS OF ORTHOGONAL RADIO SHARING ACROSS MULTIPLE LINKS

(71) Applicant: Meta Platforms Technologies, LLC, Menlo Park, CA (US)

(72) Inventors: Guoqing Li, Cupertino, CA (US); Abhishek Kumar Agrawal, Bellevue, WA (US); Chittabrata Ghosh, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 378 days.

(21) Appl. No.: 18/112,866

(22) Filed: Feb. 22, 2023

(65) Prior Publication Data

US 2023/0309017 A1 Sep. 28, 2023

Related U.S. Application Data

(60) Provisional application No. 63/322,496, filed on Mar. 22, 2022.

(51) Int. Cl.
 *H04W 52/02* (2009.01)
 *H04W 84/12* (2009.01)
(52) U.S. Cl.
 CPC ........ *H04W 52/0216* (2013.01); *H04W 84/12* (2013.01)
(58) Field of Classification Search
 CPC ............. H04W 52/0216; H04W 84/12; H04W 52/0219; Y02D 30/70
 See application file for complete search history.

(56) References Cited

U.S. PATENT DOCUMENTS

| | | | |
|---|---|---|---|
| 2018/0027485 A1 | 1/2018 | Kneckt et al. | |
| 2021/0168795 A1* | 6/2021 | Yang | H04W 72/0446 |
| 2021/0360646 A1* | 11/2021 | Chu | H04W 72/569 |
| 2022/0078844 A1 | 3/2022 | Cherian et al. | |
| 2022/0386372 A1* | 12/2022 | Xin | H04W 52/0216 |
| 2024/0098647 A1* | 3/2024 | Hu | H04L 65/612 |

OTHER PUBLICATIONS

Hu C., et al., "Prioritized EDCA Channel Access—Slot Management," IEEE Draft, Dec. 9, 2020, vol. 802.11 EHT; 802.11 be, No. 10, pp. 1-20, Retrieved from the Internet: URL: https://mentor.ieee.org/802.11/dcn/20/11-20-1046-10-00be-prioritized-edca-channel-access-slot-management.pptx, [Retrieved on Dec. 9, 2020].
International Search Report and Written Opinion for International Application No. PCT/US2023/015818, mailed Jun. 19, 2023, 11 pages.

* cited by examiner

*Primary Examiner* — Mohammad S Anwar
(74) *Attorney, Agent, or Firm* — Foley & Lardner LLP

(57) ABSTRACT

A first device may include one or more processors. The one or more processors may generate one or more request frames including a request for a first target wake time (TWT) schedule and a second TWT schedule. The one or more processors may wirelessly transmit, via a transmitter over a wireless local area network (WLAN), the generated one or more request frames to an access point (AP). In response to receiving from the AP one or more response frames accepting the request, the one or more processors may communicate (i) with the AP during a service period (SP) of the first TWT schedule and (ii) with a second device during an SP of the second TWT schedule.

20 Claims, 10 Drawing Sheets

1000

Generating, by a first device, one or more request frames including a request for a first target wake time (TWT) schedule and a second TWT schedule 1002

Wirelessly transmitting, by the first device over a wireless local area network (WLAN), the generated one or more request frames to an access point (AP) 1004

In response to receiving from the AP one or more response frames accepting the request, communicating, by the first device, (i) with the AP during a service period (SP) of the first TWT schedule, and (ii) with a second device during an SP of the second TWT schedule 1006

500

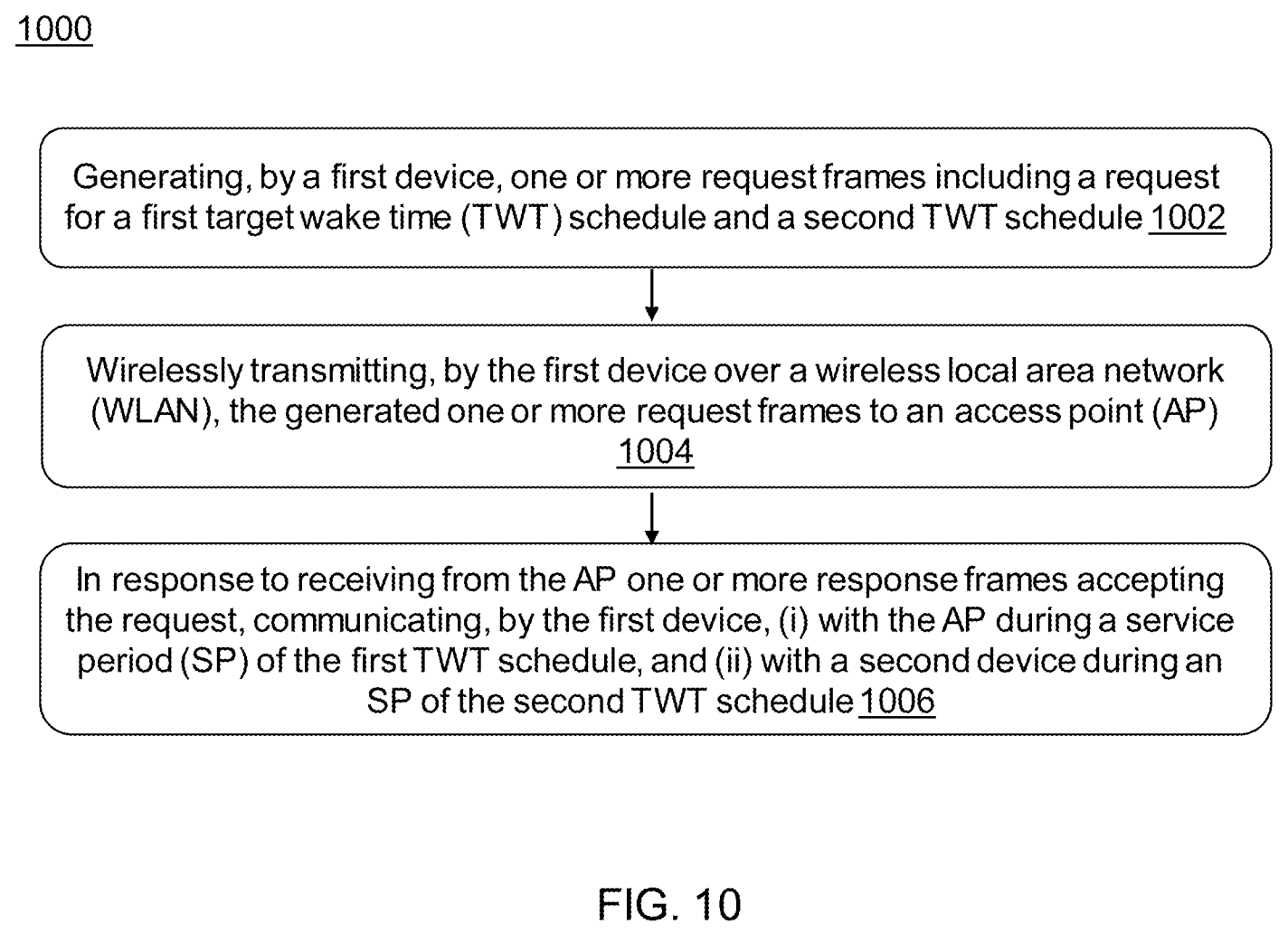

1000

Generating, by a first device, one or more request frames including a request for a first target wake time (TWT) schedule and a second TWT schedule 1002

Wirelessly transmitting, by the first device over a wireless local area network (WLAN), the generated one or more request frames to an access point (AP) 1004

In response to receiving from the AP one or more response frames accepting the request, communicating, by the first device, (i) with the AP during a service period (SP) of the first TWT schedule, and (ii) with a second device during an SP of the second TWT schedule 1006

FIG. 10

SYSTEMS AND METHODS OF ORTHOGONAL RADIO SHARING ACROSS MULTIPLE LINKS

CROSS-REFERENCE TO RELATED APPLICATION

This application claims priority to U.S. Provisional Patent Application No. 63/322,496 filed on Mar. 22, 2022, which is incorporated by reference herein in its entirety for all purposes.

FIELD OF DISCLOSURE

The present disclosure is generally related to communication with certain latency requirements, including but not limited to reducing interference in communication for artificial reality and other applications.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a first device including one or more processors. The one or more processors may be configured to generate one or more request frames including a request for a first target wake time (TWT) schedule and a second TWT schedule. The one or more processors may be configured to wirelessly transmit, via a transmitter over a wireless local area network (WLAN), the generated one or more request frames to an access point (AP). In response to receiving from the AP one or more response frames accepting the request, the one or more processors may be configured to communicate (i) with the AP during a service period (SP) of the first TWT schedule and (ii) with a second device during an SP of the second TWT schedule.

In some embodiments, the one or more processors may be configured to communicate with the second device during the SP of the second TWT schedule over a peer-to-peer (P2P) link. In some embodiments, the communication during the SP of the first TWT schedule and the communication during the SP of the second TWT schedule may be performed over respective links on different channels or at non-overlapping time periods. In some embodiments, the one or more processors may be configured to generate the one or more request frames to cause the AP to halt transmission of traffic to the first device during the SP of the second TWT schedule.

In some embodiments, the one or more processors may be configured to set a subfield of the one or more request frames to a value indicating that the second TWT schedule is used for peer-to-peer (P2P) communication. In some embodiments, the one or more processors may be configured to generate the one or more request frames to cause the AP to configure one or more quiet time periods (QTPs) during the SP of the second TWT schedule. In some embodiments, the one or more request frames may be a single TWT request frame in which one or more bits are set to a value indicating a plurality of TWT schedules are configured in the single TWT request frame.

In some embodiments, the one or more processors may be configured to receive a single TWT response frame in which one or more bits are set to a value indicating that a plurality of TWT schedules are configured in the single TWT response frame. The one or more processors may be configured to determine, from the single TWT response frame, that the AP has accepted one of the first TWT schedule and the second TWT schedule and has rejected another one of the first TWT schedule and the second TWT schedule. In response to the determining, the one or more processors may be configured to generate one or more modified request frames including a request for a modified TWT schedule to replace the rejected TWT schedule and wirelessly transmit the generated one or more modified request frames to the AP. In response to receiving from the AP one or more response frames accepting the request for the modified TWT schedule, the one or more processors may be configured to communicate with the AP or the second device during an SP of the modified TWT schedule.

Various embodiments disclosed herein are related to a method including generating, by a first device, one or more request frames including a request for a first target wake time (TWT) schedule and a second TWT schedule. The method may include wirelessly transmitting, by the first device over a wireless local area network (WLAN), the generated one or more request frames to an access point (AP). The method may include in response to receiving from the AP one or more response frames accepting the request, communicating, by the first device, (i) with the AP during a service period (SP) of the first TWT schedule, and (ii) with a second device during an SP of the second TWT schedule.

In some embodiments, the first device may communicate with the second device during the SP of the second TWT schedule over a peer-to-peer (P2P) link. In some embodiments, the communication during the SP of the first TWT schedule and the communication during the SP of the second TWT schedule may be performed over respective links on different channels or at non-overlapping time periods. In some embodiments, the first device may generate the one or more request frames to cause the AP to halt transmission of traffic to the first device during the SP of the second TWT schedule.

In some embodiments, the first device may set a subfield of the one or more request frames to a value indicating that the second TWT schedule is used for peer-to-peer (P2P) communication. In some embodiments, the first device may generate the one or more request frames to cause the AP to configure one or more quiet time periods (QTPs) during the SP of the second TWT schedule. In some embodiments, the one or more request frames may be a single TWT request frame in which one or more bits are set to a value indicating a plurality of TWT schedules are configured in the single TWT request frame.

In some embodiments, the first device may receive a single TWT response frame in which one or more bits are set to a value indicating that a plurality of TWT schedules are configured in the single TWT response frame. The first device may determine, from the single TWT response frame, that the AP has accepted one of the first TWT schedule and the second TWT schedule and has rejected another one of the first TWT schedule and the second TWT schedule. In response to the determining, the first device may generate one or more modified request frames including a request for a modified TWT schedule to replace the rejected TWT schedule and wirelessly transmit the generated one or more modified request frames to the AP. In response to receiving from the AP one or more response frames accepting the request for the modified TWT schedule, the first device may communicate with the AP or the second device during an SP of the modified TWT schedule.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 10 is a flowchart showing a process of coordinating traffic on multiple links, according to an example implementation of the present disclosure.

DETAILED DESCRIPTION

Figure 1:
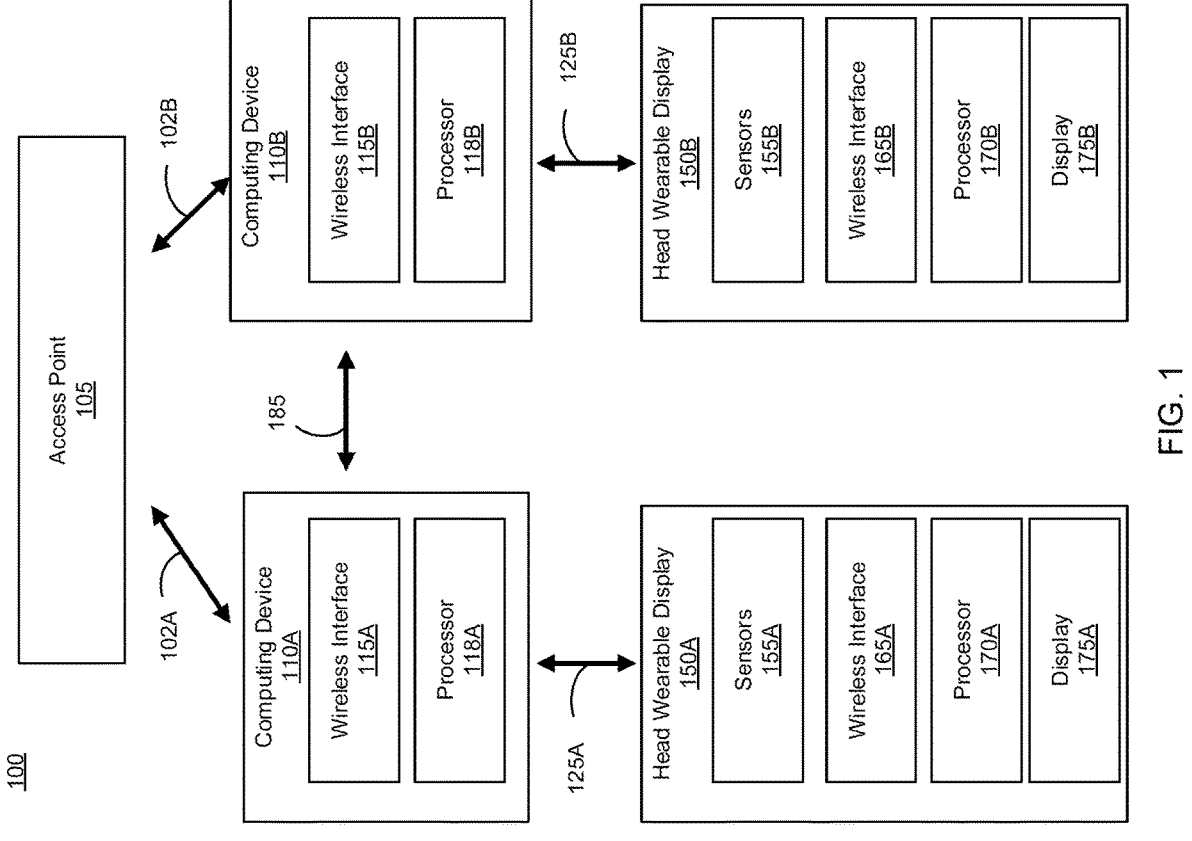
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Streams of traffic may be characterized by different types of traffic. For instance, an application may be characterized by latency sensitive traffic (e.g., video/voice (VI/VO), real time interactive applications, and the like) or regular traffic (e.g., best effort/background applications (BE/BK)). Latency sensitive traffic may be identifiable or characterized, in part, based on its bursty nature (e.g., periodic bursts of traffic), in some embodiments. For instance, video display traffic may be driven by a refresh rate of 60 Hz, 72 Hz, 90 Hz, or 120 Hz. An application and/or device may have combinations of traffic types (e.g., latency sensitive traffic and non-latency sensitive traffic). Further, each stream of traffic for the application and/or device may be more or less spontaneous and/or aperiodic as compared to the other streams of traffic for the application and/or device. Accordingly, traffic may vary according to applications and/or channel rate dynamics.

TWT can be a wake time agreed/negotiated upon by devices (e.g., access points (APs) and/or stations (STAs)), or specified/configured by one device (e.g., an AP). During the wake time, a first device (e.g., a STA) may be in an awake state (e.g., its wireless communication module/interface is in a fully powered-up ready, active or wake state) and is able to transmit and/or receive. When the first device is not awake (e.g., its wireless communication module/interface is in a powered-down, inactive, low power, or sleep state), the first device may enter a low power mode or other sleep mode. The first device may exist in the sleep state until a time instance/window as specified by the TWT.

TWT is a mechanism where a set of service periods (SPs) are defined and shared between devices to reduce/avoid medium contention and improve the power efficiency of the devices. For example, the first device can wake up periodically (e.g., at a fixed, configured time interval/period/cycle) based on the TWT. The TWT approach reduces energy consumption of the devices by limiting the awake time and associated power consumption of the devices.

An AP (e.g., AP and/or other device operating as a soft AP/hotspot) may enhance medium access protection and resource reservation by supporting restricted TWT (R-TWT). The R-TWT SPs may be used to deliver latency sensitive traffic and/or any additional frame that supports latency sensitive traffic. Latency sensitive traffic that is not prioritized (or protected) may degrade user experience. For example, in an AR context, latency between a movement of a user wearing an AR device and an image corresponding to the user movement and displayed to the user using the AR device may cause judder, resulting in motion sickness.

Disclosed herein are systems and methods related to reducing interference in communication for artificial reality and other applications. In some embodiments, a first device may include one or more processors. The one or more processors may be configured to generate one or more request frames including a request for a first TWT schedule and a second TWT schedule. The one or more processors may be configured to wirelessly transmit, via a transmitter over a WLAN, the generated one or more request frames to an AP. In response to receiving from the AP one or more response frames accepting the request, the one or more processors may be configured to communicate (i) with the AP during a service period (SP) of the first TWT schedule and (ii) with a second device during an SP of the second TWT schedule.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a computing device or a mobile device that can retrieve content from the access point 105, and can provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable the wireless interface 115 and the processor 170 may disable (e.g., may implement low power or reduced operation in) the wireless interface 165, such that the wireless interfaces 115, 165 may not consume power, or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced or minimized.

In some embodiments, the processors 118, 170 may configure or cause the wireless interfaces 115, 165 to resume communication based on stored information indicating communication between the computing device 110 and the HWD 150. In the wake up mode, the processors 118, 170 may generate and store information (e.g., channel, timing) of the communication between the computing device 110 and the HWD 150. The processors 118, 170 may schedule the wireless interfaces 115, 165 to enter a subsequent wake up mode according to timing of the previous communication indicated by the stored information. For example, the wireless interfaces 115, 165 may predict/determine when to enter the subsequent wake up mode, according to timing of the previous wake up mode, and can schedule to enter the subsequent wake up mode at the predicted time. After generating and storing the information and scheduling the subsequent wake up mode, the processors 118, 170 may configure or cause the wireless interfaces 115, 165 to enter the sleep mode. When entering the wake up mode, the processors 118, 170 may cause or configure the wireless interfaces 115, 165 to resume communication via the channel or frequency band of the previous communication indicated by the stored information. Accordingly, the wireless interfaces 115, in 165 entering the wake up mode from the sleep mode may resume communication, while bypassing a scan procedure to search for available channels and/or performing handshake or authentication. Bypassing the scan procedure allows extension of a duration of the wireless interfaces 115, 165 operating in the sleep mode, such that the computing device 110 and the HWD 150 can reduce power consumption.

In some embodiments, the computing devices 110A, 110B may coordinate operations to reduce collisions or interferences. In one approach, the computing device 110A may transmit a beacon frame periodically to announce/advertise a presence of a wireless link 125A between the computing device 110A and the HWD 150A and can coordinate the communication between the computing device 110A and the HWD 150A. The computing device 110B may monitor for or receive the beacon frame from the computing device 110A, and can schedule communication with the HWD 150B (e.g., using information in the beacon frame, such as an offset value) to avoid collision or interference with communication between the computing device 110A and the HWD 150A. For example, the computing device 110B may schedule the computing device 110B and the HWD 150B to enter a wake up mode, when the computing device 110A and the HWD 150A operate in the sleep mode. For example, the computing device 110B may schedule the computing device 110B and the HWD 150B to enter a sleep up mode, when the computing device 110A and the HWD 150A operate in the wake up mode. Accordingly, multiple computing devices 110 and HWDs 150 in proximity (e.g., within 20 ft) may coexist and operate with reduced interference.

Figure 2:
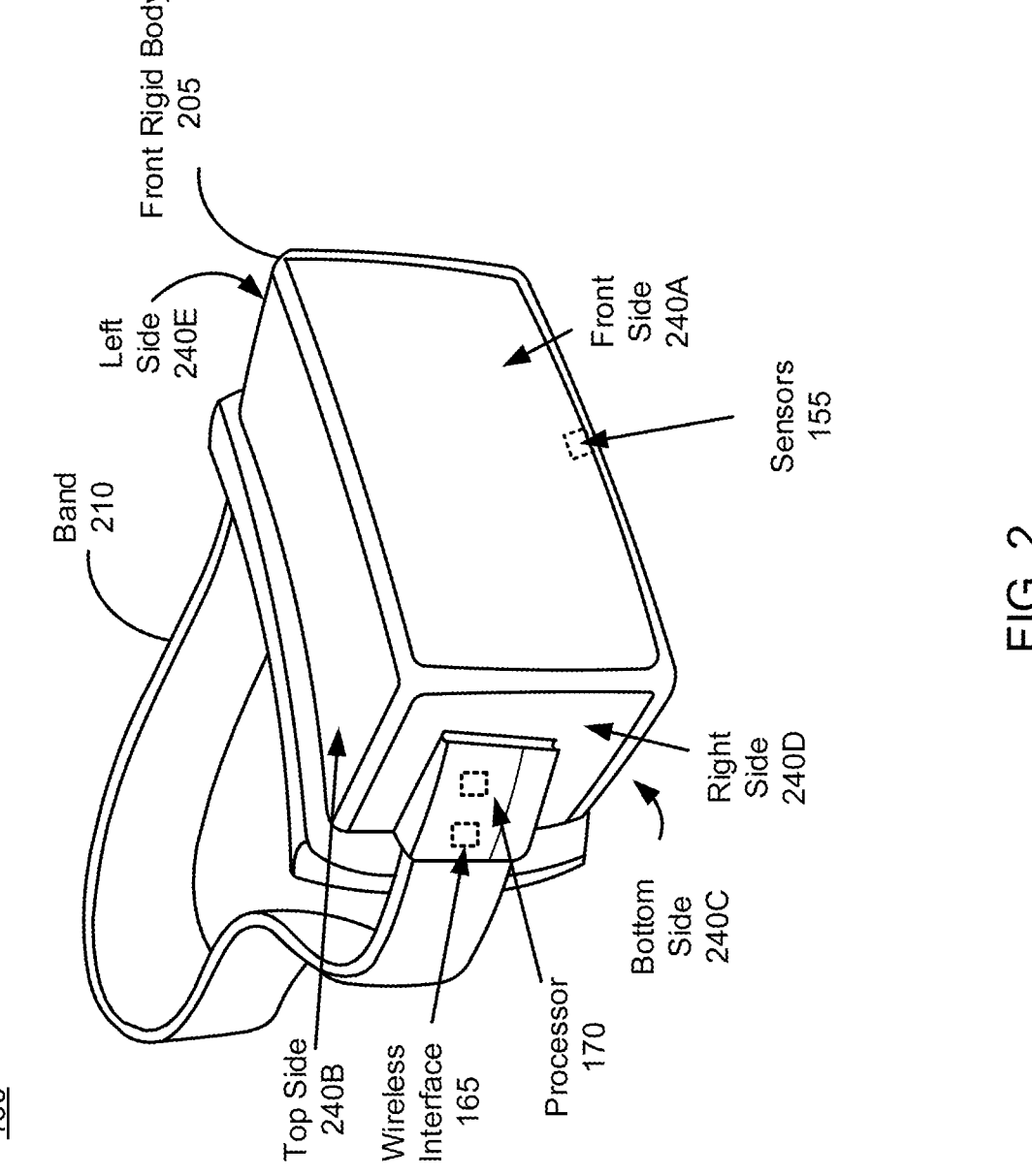
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
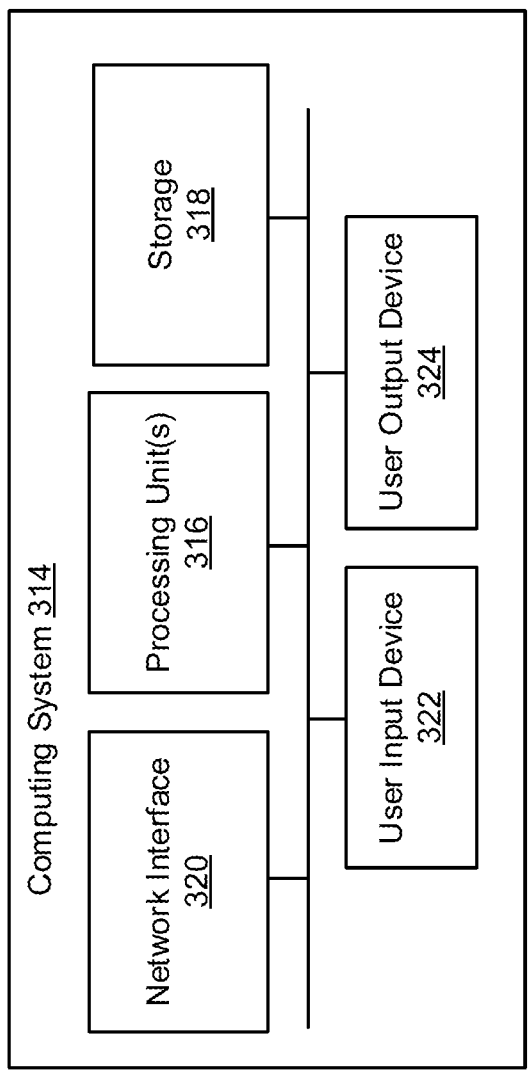
FIG. 3 is a block diagram of a computing environment, according to an example implementation of the present disclosure.

Various operations described herein can be implemented on computer systems. FIG. 3 shows a block diagram of a representative computing system 314 usable to implement the present disclosure, in accordance with an example embodiment. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests for information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

In some embodiments, a Target Wake Time (TWT) is a time agreed/negotiated upon by a computing device 110 and an access point 105, or specified/configured by one of the devices (e.g., by the access point 105). During the wake time, the computing device 110 is in an awake state (e.g., its wireless communication module/interface is in a powered-up, ready or wake state) and is able to transmit (e.g., using various contention based procedures, non-contention based procedures, and the like) and/or receive. When the computing device 110 is not awake (e.g., its wireless communication module/interface is in a powered-down, low power or sleep state), the computing device 110 may enter a low power mode or other sleep mode. The computing device 110 may exist in a sleep state until a time instance/window as specified by the TWT. The computing device 110 can wake up periodically (e.g., at a fixed, configured time interval/period/cycle) based on the TWT. The TWT reduces energy consumption of the computing device 110 by limiting the awake time and associated power consumption of the computing device 110.

Figure 4:
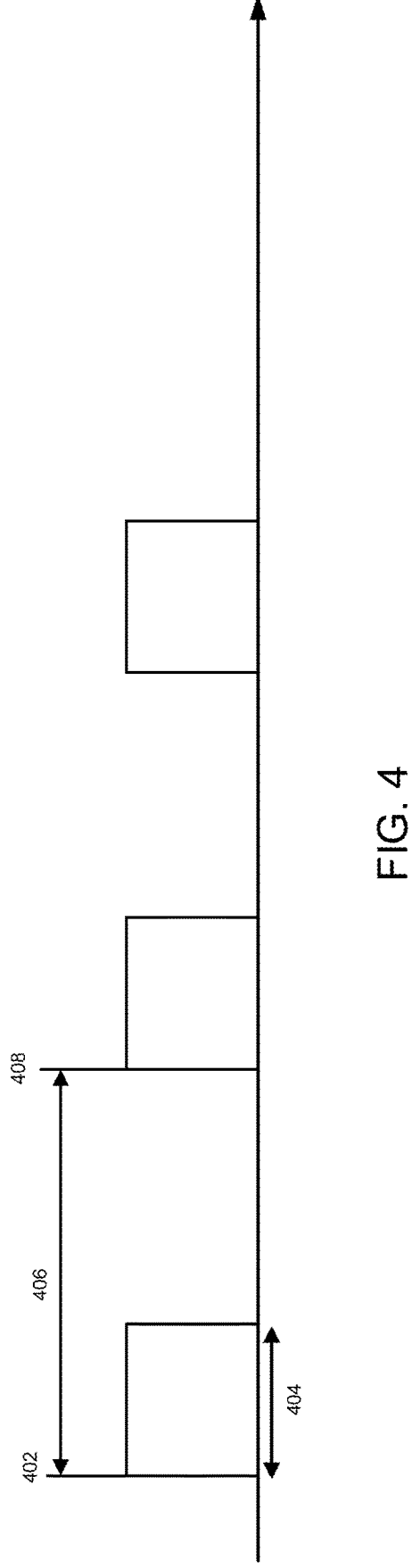
FIG. 4 is a timing diagram showing a wake-up/sleep schedule of a computing device utilizing TWT, according to an example implementation of the present disclosure.

A TWT may be characterized by a periodic, fixed, wake-sleep schedule. FIG. 4 is a timing diagram 400 showing a wake-up/sleep schedule of a computing device utilizing TWT, according to an example implementation of the present disclosure. The TWT start time is indicated by the computing device 110 (e.g., a portion of its relevant modules/circuitry) waking up at 402. The computing device 110 may wake up for a duration 404 defined by a service period (SP). After the SP duration 404, the computing device 110 may enter a sleep state until the next TWT start time at 408.

The interval of time between TWT start time 402 and TWT start time 408 may be considered the SP interval 406.

Streams of traffic across a network may be characterized by different types of traffic. For instance, an application may be characterized by latency sensitive traffic (e.g., video/voice (VINO), real time interactive applications, and the like) or regular traffic (e.g., best effort/background applications (BE/BK)). Latency sensitive traffic may be identifiable by its characteristic of periodic bursts of traffic. For instance, video display traffic may be driven by the refresh rate 60 Hz, 72 Hz, 90 Hz, and 120 Hz. An application and/or device may have combinations of traffic types.

An AP may enhance medium access protection and resource reservation by supporting restricted TWT (R-TWT). The R-TWT SPs may deliver latency sensitive traffic and/or any additional frame that supports latency sensitive traffic. Example frames that may be transmitted during a broadcast TWT SP by a TWT scheduling AP or by a TWT scheduled STA may include PS-Poll and QoS Null frames, frame exchanges for delivery of QoS data frames of TIDs indicated by the R-TWT TID Bitmap subfield (as discussed herein), bandwidth query report frames (BQRs), buffer status report (BSR) frames (the TIDs in the BSR may include the TIDs indicated by the R-TWT TID Bitmap subfield, as described herein), frames that may be sent as part of a sounding feedback exchange, management frames (e.g., action or action No acknowledge (ACK) frames), and control response frames.

The AP may achieve more predictable latency and reduce worst-case latency for latency sensitive traffic using R-TWT. An AP may enhance medium access protection and resource reservation by announcing, for example, one or more quiet intervals with Quiet Elements that overlap with R-TWT SPs. In some configurations, STAs that are not configured with R-TWT may end the transmission opportunity (TXOP), if any, before the start of the R-TWT SP to provide for a more predictable latency performance (e.g., by reducing jitter resulting from a varying SP start time, the varying SP start times caused by unfinished transmissions). The STAs that are configured with R-TWT capability are allowed to ignore the quiet intervals.

In the event there is a R-TWT agreement setup, an AP may announce R-TWT SP schedule information. The R-TWT SP schedule information may schedule (e.g., provide an indication/specification of a schedule/timing of) restricted SP(s) for a duration of time. For example, one or more SPs may occur or be scheduled during the duration of time. The R-TWT SP schedule information may be configured in a modified broadcast TWT element that may be transmitted using broadcast management frames containing broadcast TWT element transmitted beacons (e.g., individual and/or broadcast), probe response frames, association (or re-association) frames, fast initial link setup (FILS) discovery, and/or other frames. Different rules may be defined for configuring different frames.

Figure 5:
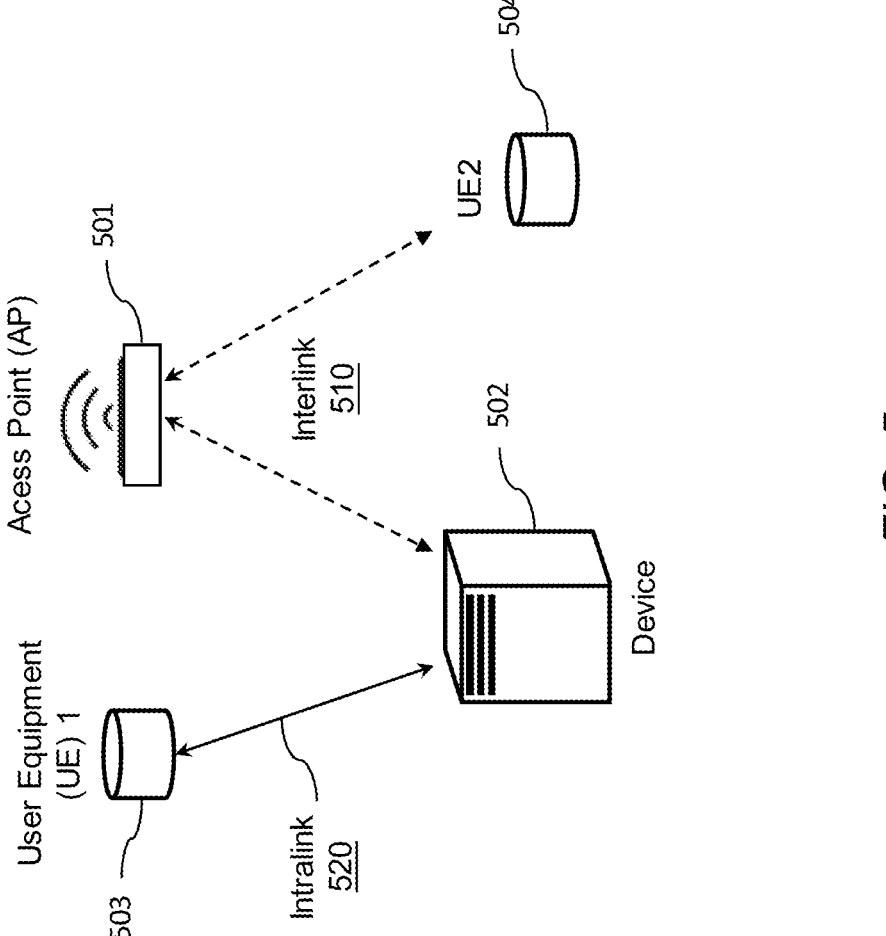
FIG. 5 is a diagram illustrating an example scenario in which a device shares a radio for traffic on an interlink and traffic on an intralink, according to an example implementation of the present disclosure.

In some embodiments, multiple communication links may be used to communicate with a device. FIG. 5 is a diagram of an example scenario 500 in which a device 502 shares a radio for (1) traffic on an interlink 510 connected to an AP 501 and (2) traffic on an intralink 520 connected to an user equipment (UE) 503 (UE1), according to an example implementation of the present disclosure. The device 502 may include an AR/VR computing device or any internet/network connected computing device such as remote PCs, smart phones, wearable devices. The device 502 may operate as a soft AP to the UE 503 (UE1). The UE1 (503) may be an AR/VR device such as smart glass, head wearable/ mounted device, head wearable/mounted display. Here, an "interlink" (or infrastructure link, infralink, AP link) can refer to a link between an AP (e.g., AP 501) and devices associated with the AP (e.g., the device 502). The "intralink" can include a peer-to-peer (P2P) link, or device link, and can refer to a link between a device (e.g., device 502) and another device (e.g., UE1 503).

In a scenario like the example scenario shown in FIG. 5, radio sharing may be coordinated. A device (e.g., device 502) may have a single Wi-Fi radio (or chip) which may be used by multiple links (e.g., intralink 520 and interlink 510). If multiple links are configured for the same channel, and the links are active at the same time, then contention protocols may be executed to reduce interference, thereby leading to loss, increased delay, and/or poor network throughput.

To address these problems and/or benefits, disclosed herein includes systems, devices and methods for coordinating traffic/activity on multiple links to be orthogonal in time and/or channel. In some embodiments, a system may perform intra-BSS (basic service set) interference avoidance by coordinating interlink traffic (e.g., AP traffic) and intralink traffic (e.g., P2P traffic) to occur/happen on different times so that traffic on multiple links (e.g., the interlink traffic and the intralink traffic) may not contend with each other. For example, using a scenario with at least two links (interlink and intralink) for illustration, a system may coordinate time slots for interlink traffic and intralink traffic such that intralink traffic slots may be free from interference from interlink traffic slots (e.g., slots for traffic of an interlink AP and other peers connected to the same AP).

In one approach, systems/methods/devices may efficiently orthogonalize intralink traffic and interlink traffic (e.g., coordinating intralink traffic and interlink traffic to be orthogonal in time) using TWT features. In some embodiments, a device may negotiate a first TWT schedule (or TWT session/configuration) with an AP for interlink traffic. The negotiation for the first TWT schedule may include negotiations for TWT parameters such as wake up interval, wake up duration, duration of each cycle (e.g., each including a corresponding wake up interval and sleep interval), etc. The device may also negotiate a second TWT schedule (or TWT session/configuration) with the AP such that the device can use the second TWT schedule for intralink traffic (e.g., Peer-to-peer (P2P) traffic). The negotiation for the second TWT schedule may include negotiations for TWT parameters such as wake up interval, wake up duration, duration of each cycle, etc. The device and the AP may configure multiple TWT schedules (e.g., the first TWT schedule and the second TWT schedule) in an orthogonal manner (e.g., orthogonal in time and/or channel). In some embodiments, the device can send one or more TWT request frames (or TWT setup request frames) to the AP with requests for the first TWT schedule and the second TWT schedule. The AP may respond with one or more TWT response frames (or TWT setup response frame) accepting (or modifying/rejecting) the requests for the one or more TWT schedules (e.g., the first TWT schedule and the second TWT schedule). The AP may not be aware of the usage of the second TWT schedule (e.g., using the second TWT schedule for intralink traffic or P2P traffic) and the AP can send trigger frames or download (DL) traffic during a service period (SP) of the second TWT. In other words, a coordination of the first and second TWT schedules in an orthogonal manner may not provide protection from the AP communicating DL traffic during SPs of the second TWT schedule.

In some embodiments, a TWT negotiation between the AP and the device may continue until there is an agreement between the AP and the device. Once the negotiation completes, the AP may advertise the negotiated TWT schedules (e.g., the first TWT schedule and the second TWT schedule) in one or more beacon frames. In some embodiments, the beacon frame may include one or more TWT elements corresponding to the TWT schedules that have been negotiated, thereby allowing nearby devices (e.g., devices associated with the AP) to communicate during SPs of their respective TWT schedules identified in the beacon frame. The device may maintain the negotiated timing coordination across the two links (e.g., interlink and intralink) and can manage traffic buffers to communicate traffic according to the configured/negotiated TWT schedules. The device may switch between SPs of the first TWT schedule and SPs of the second TWT schedule to serve different links on different channels and/or at non-overlapping time periods. For example, the device may communicate with the UE1 during an SP of the first TWT schedule, and communicate with the AP during an SP of the second TWT schedule.

In some embodiments, a device may negotiate a first TWT schedule (or TWT session/configuration) with an AP for interlink traffic (e.g., negotiating for TWT parameters such as wake up interval, wake up duration, duration of each cycle, etc.). The device may also negotiate a second TWT schedule (or TWT session/configuration) with the AP (e.g., negotiating for TWT parameters such as wake up interval, wake up duration, duration of each cycle, etc.) such that the device can use the second TWT schedule for intralink traffic (e.g., P2P traffic). The device and the AP may configure multiple TWT schedules (e.g., the first TWT schedule and the second TWT schedule) in an orthogonal manner (e.g., orthogonal in time and/or channel). In some embodiments, the device can send one or more TWT request frames to the AP with requests for the first TWT schedule and the second TWT schedule. The AP may respond with one or more TWT response frames accepting (or modifying/rejecting) the requests for the one or more TWT schedules (e.g., the first TWT schedule and the second TWT schedule). In negotiating the second TWT schedule, the device may include/configure an indication in a TWT setup request frame (or TWT setup request packet) and can send the TWT setup request frame to the AP, indicating to the AP that SPs of the second TWT schedule may be used for P2P communication/traffic. The device may repurpose a reserved bit in the TWT setup request frame to indicate P2P traffic. In some embodiments, other bits in the TWT setup request frame may be repurposed/added/modified to explicitly indicate to the AP that the second TWT schedule is used for P2P traffic. In some embodiments, one or more bits/fields in frames other than the TWT setup request frame may be repurposed/added/modified to explicitly indicate to the AP that the second TWT schedule is used for P2P traffic. Using the indication of P2P traffic, the AP may be aware that the second TWT schedule is for P2P link (or intralink) so that the AP does not transmit any DL frames to the device during SPs of the second TWT schedule and the second TWT can be protected from (e.g., interference/contention from) the AP's DL traffic. In this manner, the AP can refrain from transmitting DL traffic to the device during SPs of the second TWT schedule, thereby reducing contention from the AP's DL traffic during P2P transmission (e.g., P2P transmission/communication between the device 502 and the UE1 503 in FIG. 5).

In some embodiments, a TWT negotiation between the AP and the device may continue until there is an agreement between the AP and the device. Once the negotiation completes, the AP may advertise the negotiated TWT schedules (e.g., the first TWT schedule and the second TWT schedule) in one or more beacon frames. In some embodiments, the beacon frame may include one or more TWT elements corresponding to the TWT schedules that have been negotiated, thereby causing nearby devices (e.g., devices associated with the AP) during SPs of the TWT schedules identified in the beacon frame. The device may maintain the negotiated timing coordination across the two links (e.g., interlink and intralink) and manage traffic buffers to communicate traffic according to the configured/negotiated TWT schedules. The device may switch between SPs of the first TWT schedule and SPs of the second TWT schedule to serve different links on different channels and/or at non-overlaping time periods. For example, the device may communicate with the UE1 during an SP of the first TWT schedule and can communicate with the AP during an SP of the second TWT schedule.

In some embodiments, a device may negotiate a first TWT schedule (or TWT session/configuration) with an AP for interlink traffic (e.g., negotiating for TWT parameters such as wake up interval, wake up duration, duration of each cycle, etc.). The device may also negotiate a second TWT schedule (or TWT session/configuration) with the AP (e.g., negotiating for TWT parameters such as wake up interval, wake up duration, duration of each cycle, etc.) such that the device can use the second TWT schedule for intralink traffic (e.g., P2P traffic). The device and the AP may configure multiple TWT schedules (e.g., the first TWT schedule and the second TWT schedule) in an orthogonal manner (e.g., orthogonal in time and/or channel). In some embodiments, the device can send one or more TWT request frames to the AP with requests for the first TWT schedule and the second TWT schedule. The AP may respond with one or more TWT response frames accepting (or modifying/rejecting) the requests for the one or more TWT schedules (e.g., the first TWT schedule and the second TWT schedule). The device may request that the AP configure one or more quiet time periods (QTP) (or quiet elements) during SPs of the second TWT schedule, indicating to the AP that SPs of the second TWT schedule may be used for P2P communication/traffic. For example, the device may send to the AP a QTP request frame requesting for configuring QTPs during the SPs of the second TWT schedule. In response, the AP may broadcast a QTP response announcing that the QTP procedure/request has been permitted, thereby protecting the SPs of the second TWT schedule from traffic of the AP and other devices associated with the AP. The QTP procedure may be performed any time, e.g., before, during or after the negotiation for the second TWT schedule. Using the QTP procedure, the AP may be aware that the second TWT schedule is for P2P link (or intralink) so that the AP does not transmit any DL frames to the device during SPs of the second TWT schedule and the second TWT can be protected from (e.g., interference/contention from) the AP's DL traffic. Moreover, other devices (e.g., devices associated with the AP) may be aware that the second TWT schedule is for P2P link (or intralink). In this manner, QTP can reduce contention from other devices (as well as from the AP) during SPs of the second TWT schedule.

In some embodiments, a TWT negotiation between the AP and the device may continue until there is an agreement between the AP and the device. Once the negotiation completes, the AP may advertise the negotiated TWT schedules (e.g., the first TWT schedule and the second TWT schedule) in one or more beacon frames. In some embodiments, the beacon frame may include one or more TWT elements corresponding to the TWT schedules that have been negotiated, thereby causing nearby devices (e.g., devices associated with the AP) during SPs of the TWT schedules identified in the beacon frame. In some embodiments, the beacon frame may include one or more QTP elements or quiet elements corresponding to the QTPs determined during the QTP procedure. The device may maintain the negotiated timing coordination across the two links (e.g., interlink and intralink) and manage traffic buffers to communicate traffic according to the configured/negotiated TWT schedules. The device may switch between SPs of the first TWT schedule and SPs of the second TWT schedule to serve different links on different channels and/or at non-overlapping time periods. For example, the device may communicate with the UE1 during an SP of the first TWT schedule and can communicate with the AP during an SP of the TWT schedule.

In one approach, a TWT negotiation may be employed to configure multiple TWT schedules (or TWT sessions) using a single TWT request frame and/or a single TWT response frame. In some embodiments, a device can send a single TWT request frame to the AP with requests for the first TWT schedule and the second TWT schedule. The single TWT request frame may include TWT information elements (TWT IEs) corresponding to the requested first TWT schedule and the requested second TWT schedule. The AP may respond with a single TWT response frame accepting (or modifying/rejecting) the requests for the one or more TWT schedules (e.g., the first TWT schedule and the second TWT schedule). The single TWT response frame may include TWT IEs corresponding to the accepted (or modified/rejected) first TWT schedule and the accepted (or modified/rejected) second TWT schedule. In some embodiments, one or more bits/fields in a frame format of TWT request frame/TWT response frame (or other frames/information elements) may be modified/repurposed/added to indicate that multiple TWT sessions (or TWT schedules) are being configured in a single TWT request frame or a single TWT response frame. In some embodiments, a TWT negotiation between the AP and the device may continue until there is an agreement between the AP and the device. For example, during a TWT negotiation, the AP may accept one TWT schedule and reject/modify a different TWT schedule in a single TWT response frame, and the AP and the device may continue the negotiation until there is an agreement with both TWT schedules. Once the negotiation completes, the AP may advertise the negotiated TWT schedules (e.g., the first TWT schedule and the second TWT schedule) in one or more beacon frames. In some embodiments, the beacon frame may include one or more TWT elements corresponding to the TWT schedules that have been negotiated, thereby allowing nearby devices (e.g., devices associated with the AP) to communicate during their respective SPs of the TWT schedules identified in the beacon frame. The device may maintain the negotiated timing coordination across the two links (e.g., interlink and intralink) and can manage traffic buffers to communicate traffic according to the configured/negotiated TWT schedules. The device may switch between SPs of the first TWT schedule and SPs of the second TWT schedule to serve different links on different channels and/or at non-overlapping time periods. For example, the device may communicate with the UE1 during an SP of the first TWT schedule and communicate with the AP during an SP of the second TWT schedule.

In one approach, a first device (e.g., device 502 in FIG. 5) may include one or more processors. The one or more processors may generate one or more request frames including a request for a first target wake time (TWT) schedule and a second TWT schedule. The one or more processors may wirelessly transmit, via a transmitter over a wireless local area network (WLAN), the generated one or more request frames to an access point (AP) (e.g., AP 501 in FIG. 5). In response to receiving from the AP one or more response frames accepting the request, the one or more processors may communicate (i) with the AP during a service period (SP) of the first TWT schedule and (ii) with a second device (e.g., UE1 503 in FIG. 5) during an SP of the second TWT schedule.

In some embodiments, the one or more processors may be configured to communicate with the second device during the SP of the second TWT schedule over a peer-to-peer (P2P) link. In some embodiments, the communication during the SP of the first TWT schedule and the communication during the SP of the second TWT schedule may be performed over respective links on different channels or at non-overlapping time periods. In some embodiments, the one or more processors may be configured to generate the one or more request frames to cause the AP to halt/avoid/skip/defer/stop transmission of traffic to the first device during the SP of the second TWT schedule.

In some embodiments, the one or more processors may be configured to set a subfield of the one or more request frames to a value indicating that the second TWT schedule is used for peer-to-peer (P2P) communication. In some embodiments, the one or more processors may be configured to generate the one or more request frames to cause the AP to configure one or more quiet time periods (QTPs) during the SP of the second TWT schedule. In some embodiments, the one or more request frames may be a single TWT request frame in which one or more bits are set to a value indicating a plurality of TWT schedules are configured in the single TWT request frame.

In some embodiments, the one or more processors may be configured to receive a single TWT response frame in which one or more bits/fields are set to a value indicating that a plurality of TWT schedules are configured in the single TWT response frame. The one or more processors may be configured to determine, from the single TWT response frame, that the AP has accepted one of the first TWT schedule and the second TWT schedule and has rejected another one of the first TWT schedule and the second TWT schedule. In response to the determining, the one or more processors may be configured to generate one or more modified request frames including a request for a modified TWT schedule to replace the rejected TWT schedule and wirelessly transmit the generated one or more modified request frames to the AP. In response to receiving from the AP one or more response frames accepting the request for the modified TWT schedule, the one or more processors may be configured to communicate with the AP or the second device during an SP of the modified TWT schedule.

Embodiments in the present disclosure have at least the following advantages and benefits.

First, embodiments in the present disclosure can provide useful techniques for a device to negotiate/coordinate/set up/configure a first TWT schedule for interlink traffic and a second TWT schedule for intralink traffic (e.g., P2P traffic) in an orthogonal manner in time and/or frequency. With this configuration, interference between the interlink traffic and the intralink traffic can be reduced, thereby leading to reduced loss, reduced delay/latency, and/or better network throughput.

Second, embodiments in the present disclosure can provide useful techniques for indicating to the AP that a particular TWT schedule is used for intralink traffic or P2P traffic, using one or more bits of a frame indicating P2P traffic or using a QTP procedure. With this configuration, the AP does not transmit any DL frames to the device during SPs of the particular TWT schedule and the particular TWT can be protected from (e.g., collision/contention from) the AP's DL traffic.

Figure 6:
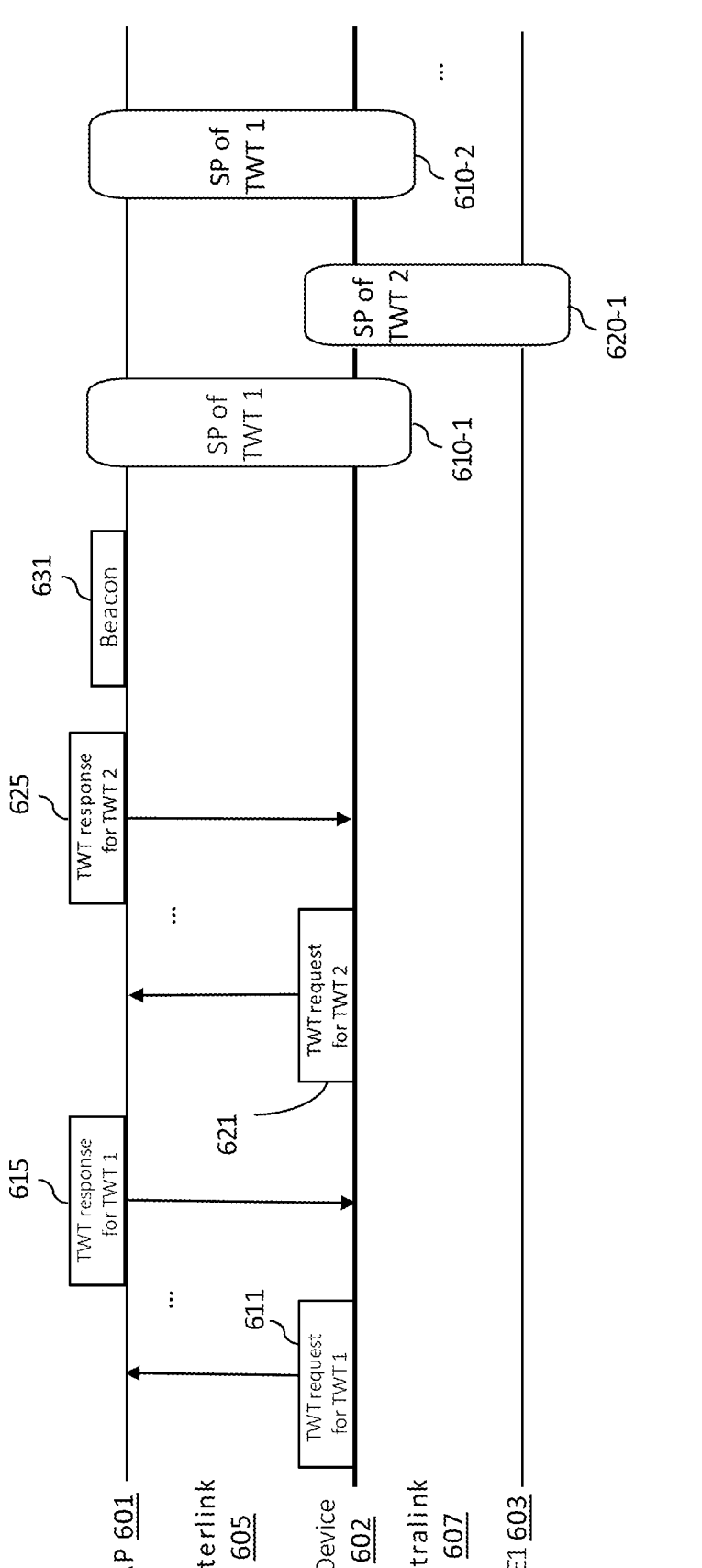
FIG. 6 is a timing diagram showing an example procedure for setting up multiple TWT schedules for interlink traffic and intralink traffic, according to an example implementation of the present disclosure.

FIG. 6 is a timing diagram showing an example procedure 600 for setting up multiple TWT schedules for interlink traffic (e.g., traffic over an interlink 605) and intralink traffic (e.g., traffic over an intralink 607), according to an example implementation of the present disclosure. Referring to FIG. 6, an AP 601, a device 602, and a UE1 603 may be wirelessly connected/communicated in a manner similar to that of the AP 501, the device 502, and the UE1 503 as shown in FIG. 5. The device 602 may negotiate a first TWT schedule (TWT 1) with the AP 601 for interlink traffic. The negotiation for the first TWT schedule may include negotiations for TWT parameters such as wake up interval, wake up duration, duration of each cycle, etc. The device 602 may also negotiate a second TWT schedule (TWT 2) with the AP 601 such that the device 602 can use the second TWT schedule for intralink traffic (e.g., P2P traffic to/from the UE1 603). The negotiation for the second TWT schedule may include negotiations for TWT parameters such as wake up interval, wake up duration, duration of each cycle, etc. The device 602 and the AP 601 may configure multiple TWT schedules (e.g., TWT 1 and TWT 2) in an orthogonal manner (e.g., orthogonal in time and/or channel). In some embodiments, the device 602 may send TWT request frames 611, 621 to the AP 601 with requests for TWT 1 and TWT 2, respectively. The AP 602 may respond with TWT response frames 615, 625 accepting (or modifying/rejecting) the requests for TWT 1 and TWT 2, respectively. The AP 601 may not be aware of the usage of the second TWT schedule (e.g., using the second TWT schedule for intralink traffic or P2P traffic) and the AP 601 can send trigger frames or download (DL) traffic during a service period (SP) of the second TWT. In other words, a coordination of the first and second TWT schedules in an orthogonal manner as shown in FIG. 6 may not provide protection from the AP 601 communicating DL traffic during SPs of the second TWT schedule.

In some embodiments, a TWT negotiation between the AP 601 and the device 602 may continue until there is an agreement between the AP and the device. Once the negotiation completes (e.g., the AP accepting a TWT request), the AP 601 may advertise the negotiated TWT schedules (e.g., TWT 1 and TWT 2) in one or more beacon frames (e.g., beacon frame 631). In some embodiments, the beacon frame 631 may include one or more TWT elements (e.g., TWT IEs) corresponding to the TWT schedules that have been negotiated, thereby causing nearby devices (e.g., UE2 associated with the AP as shown in FIG. 5) during SPs of the TWT schedules identified in the beacon frame (e.g., SPs 610-1, 610-2, 620-1). The device 602 may maintain the negotiated timing coordination across the two links (e.g., interlink 605 and intralink 607) and can manage traffic buffers to communicate traffic according to the configured/negotiated TWT schedules. The device 602 may switch between SPs of the first TWT schedule (e.g., TWT 1 SPs 610-1, 610-2) and SPs of the second TWT schedule (e.g., TWT 2 SP 620-1) to serve different links on different channels and/or at non-overlapping time periods. For example, the device 602 may communicate with the UE1 603 during the TWT 1 SPs 610-1, 610-2 and communicate with the AP during the TWT 2 SP 620-1.

Figure 7:
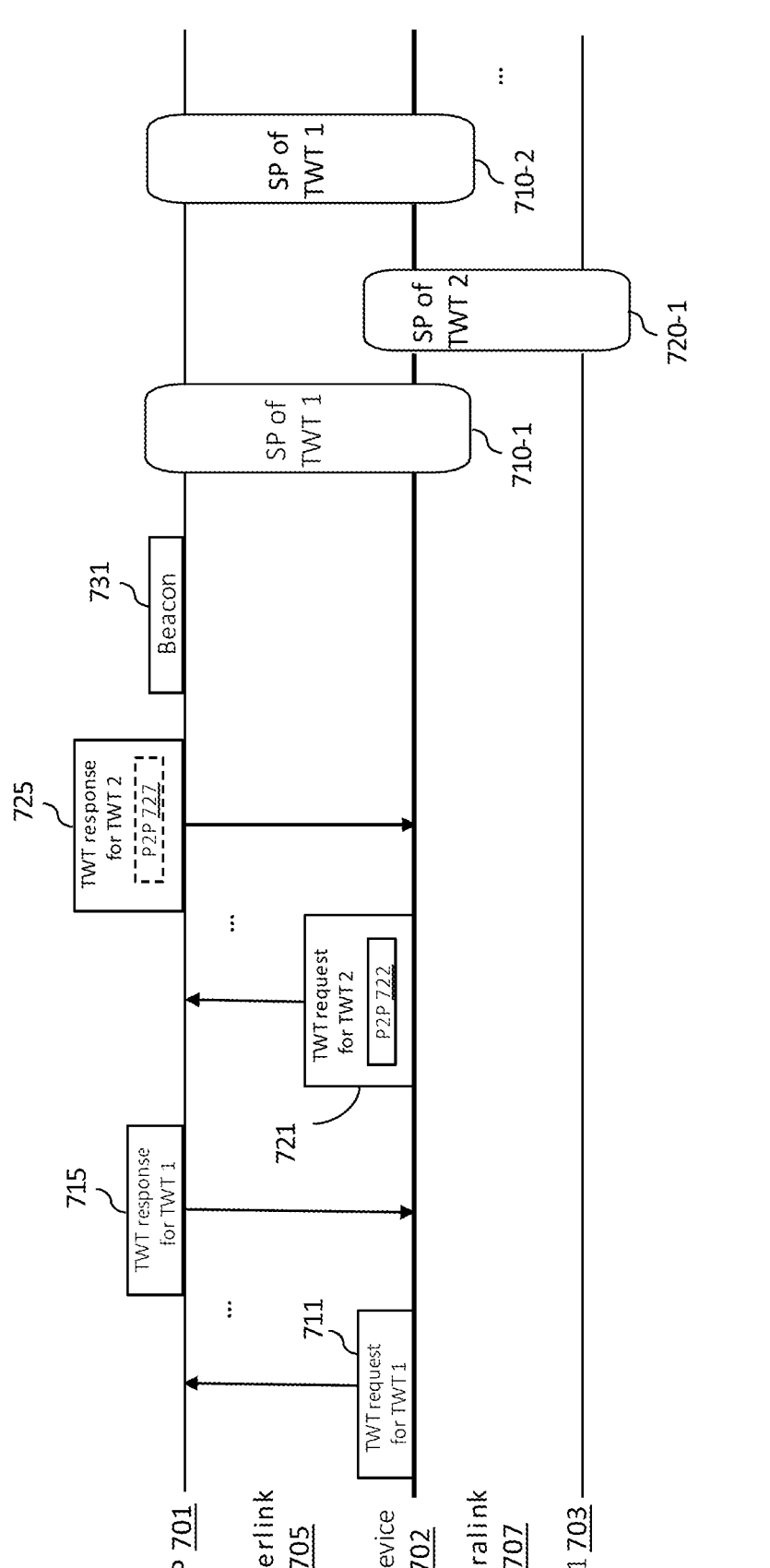
FIG. 7 is a timing diagram showing another example procedure for setting up multiple TWT schedules for inter-link traffic and intralink traffic using an indication of peer-to-peer (P2P) traffic in frames, according to an example implementation of the present disclosure.

FIG. 7 is a timing diagram showing another example procedure 700 for setting up multiple TWT schedules for interlink traffic (e.g., traffic over an interlink 705) and intralink traffic (e.g., traffic over an intralink 707) using an indication of P2P traffic in frames, according to an example implementation of the present disclosure. Referring to FIG. 7, an AP 701, a device 702, and a UE1 703 may be wirelessly connected/communicated in a manner similar to that of the AP 501, the device 502, and the UE1 503 as shown in FIG. 5. The device 702 may negotiate a first TWT schedule (TWT 1) with the AP 702 for interlink traffic (e.g., negotiating for TWT parameters such as wake up interval, wake up duration, duration of each cycle, etc.). The device 702 may also negotiate a second TWT schedule (TWT 2) with the AP 701 (e.g., negotiating for TWT parameters such as wake up interval, wake up duration, duration of each cycle, etc.) such that the device 702 can use the second TWT schedule for intralink traffic (e.g., P2P traffic). The device 702 and the AP 701 may configure multiple TWT schedules (e.g., TWT 1 and TWT 2) in an orthogonal manner (e.g., orthogonal in time and/or channel). In some embodiments, the device 702 may send TWT request frames 711, 721 to the AP 701 with requests for TWT 1 and TWT 2, respectively. The AP 701 may respond with TWT response frames 715, 725 accepting (or modifying/rejecting) the requests for TWT 1 and TWT 2, respectively. In negotiating TWT 2, the device 702 may include/configure an indication (e.g., "P2P" subfield 722 or one or more bits which may be set to a particular value) in a TWT setup request frame (e.g., TWT request frame 721) and send the TWT request frame 721 to the AP 701, indicating to the AP that SPs of TWT 2 may be used for P2P communication/traffic. The device 702 may repurpose a reserved bit in the TWT request frame 721 to indicate P2P traffic. In some embodiments, other bits in the TWT request frame 721 may be repurposed/added/modified to explicitly indicate to the AP 701 that TWT 2 is used for P2P traffic. In some embodiments, one or more bits in frames other than TWT setup request frames may be repurposed/added/modified to explicitly indicate to the AP 701 that TWT 2 is used for P2P traffic. In some embodiments, the AP 702 may include/configure an indication ("P2P" subfield 727 or one or more bits which may be set to a particular value) in a TWT setup response frame (e.g., TWT response frame 725) and can send the TWT response frame 725 accepting (or modifying/rejecting) the request for TWT 2. Using the indication of P2P traffic in the TWT setup request/response frames, the AP 701 may be aware that TWT 2 is for P2P link (or intralink) so that the AP 701 does not transmit any DL frames to the device 702 during SPs of TWT 2 (e.g., SP 720-1) and TWT 2 can be protected from the AP's DL traffic. In this manner, the AP 701 can refrain from transmitting DL traffic to the device 702 during SPs of the second TWT schedule (e.g., SP 720-1), thereby reducing contention from the AP's DL traffic during P2P transmission (e.g., P2P transmission/communication between the device 702 and the UE1 703).

In some embodiments, a TWT negotiation between the AP 701 and the device 702 may continue until there is an agreement between the AP 701 and the device 702. Once the negotiation completes, the AP 701 may advertise the negotiated TWT schedules (e.g., TWT 1 and TWT 2) in one or more beacon frames (e.g., beacon frame 731). In some embodiments, the beacon frame 731 may include one or more TWT elements (e.g., TWT IEs) corresponding to the TWT schedules that have been negotiated, thereby causing nearby devices (e.g., UE2 504 associated with the AP as shown in FIG. 5) to communicate during their respective SPs of the TWT schedules identified in the beacon frame 731 (e.g., TWT 1 and TWT 2). The device 702 may maintain the negotiated timing coordination across the two links (e.g., interlink 705 and intralink 707) and can manage traffic buffers to communicate traffic according to the configured/negotiated TWT schedules. The device 702 may switch between SPs of TWT 1 (e.g., SPs 710-1, 710-2) and SPs of TWT 2 (e.g., SP 720-1) to serve different links on different channels and/or at non-overlapping time periods. For example, the device 702 may communicate with the UE1 703 during the TWT 2 SP 720-1 and communicate with the AP 701 during the TWT 1 SPs 710-1, 710-2.

Figure 8:
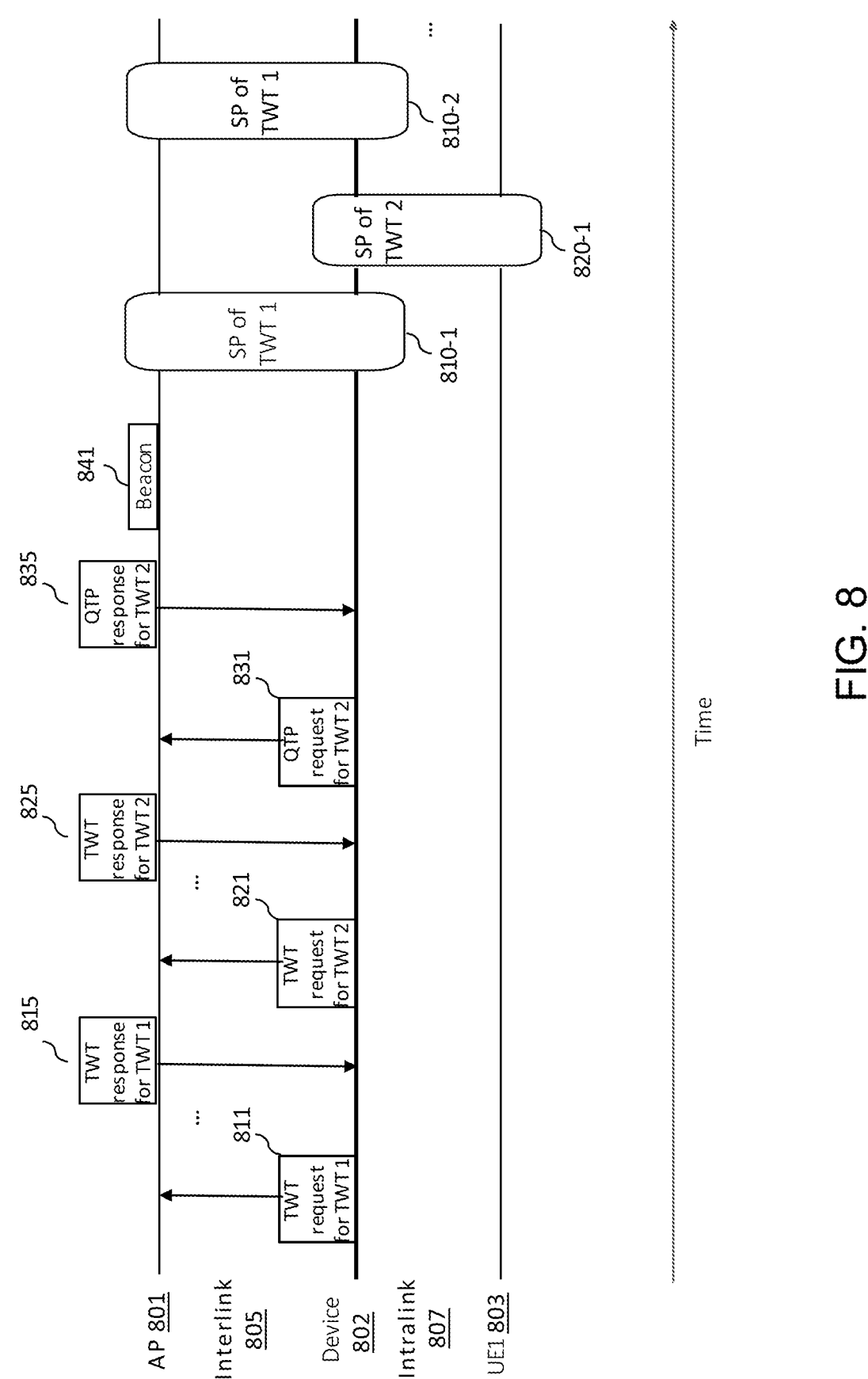
FIG. 8 is a timing diagram showing another example procedure for setting up multiple TWT schedules for interlink traffic and intralink traffic using a quiet time period (QTP) approach, according to an example implementation of the present disclosure.

FIG. 8 is a timing diagram showing another example procedure 800 for setting up multiple TWT schedules for interlink traffic (e.g., traffic over an interlink 805) and intralink traffic (e.g., traffic over an intralink 807) using a quiet time period (QTP) procedure, according to an example implementation of the present disclosure. Referring to FIG. 8, an AP 801, a device 802, and a UE1 803 may be wirelessly connected/communicated in a manner similar to that of the AP 501, the device 502, and the UE1 503 as shown in FIG. 5. The device 802 may negotiate a first TWT schedule (TWT 1) with the AP 801 for interlink traffic (e.g., negotiating for TWT parameters such as wake up interval, wake up duration, duration of each cycle, etc.). The device 802 may also negotiate a second TWT schedule (TWT 2) with the AP 801 (e.g., negotiating for TWT parameters such as wake up interval, wake up duration, duration of each cycle, etc.) such that the device 802 can use TWT 2 for intralink traffic (e.g., P2P traffic). The device 802 and the AP 801 may configure multiple TWT schedules (e.g., TWT 1 and TWT 2) in an orthogonal manner (e.g., orthogonal in time and/or channel). In some embodiments, the device 802 can send one or more TWT request frames (e.g., TWT request frames 811, 821) to the AP 801 with requests for the TWT 1 and TWT 2, respectively. The AP may respond with TWT response frames (e.g., TWT response frames 815, 825 accepting (or modifying/rejecting) the requests for TWT 1 and TWT 2, respectively. The device 802 may request that the AP 801 configure one or more QTPs (or quiet elements) during SPs of TWT 2 (e.g., SP 820-1 of TWT 2), indicating to the AP 801 that SPs of TWT 2 may be used for P2P communication/traffic. For example, the device 802 may send to the AP 801 a QTP request frame 831 requesting for configuring QTPs during the SPs of the TWT 2. In response, the AP 801 may broadcast a QTP response 835 announcing that the QTP procedure/request has been permitted, thereby protecting the SPs of TWT 2 from traffic of the AP 801 and other devices associated with the AP (e.g., UE2 504 in FIG. 5). The QTP procedure may be performed any time, e.g., before, during or after the negotiation for TWT 2. Using the QTP procedure, the AP 801 may be aware that TWT 2 is for P2P link (or intralink) so that the AP 801 does not transmit any DL frames to the device 802 during SPs of TWT 2 and TWT 2 can be protected from the AP's DL traffic. Moreover, other devices (e.g., UE2 504 in FIG. 5) may be aware that TWT 2 is for P2P link (or intralink). In this manner, QTP can reduce contention from other devices (as well as from the AP 801) during SPs of TWT 2.

In some embodiments, a TWT negotiation between the AP 801 and the device 802 may continue until there is an agreement between the AP 801 and the device 802. Once the negotiation completes, the AP 801 may advertise the negotiated TWT schedules (e.g., TWT 1 and TWT 2) in one or more beacon frames (e.g., beacon frame 841). In some embodiments, the beacon frame 841 may include one or more TWT elements (e.g., TWT IEs) corresponding to the TWT schedules that have been negotiated, thereby causing nearby devices (e.g., UE2 504 associated with the AP as shown in FIG. 5) during SPs of the TWT schedules identified in the beacon frame 841 (e.g., TWT 1 and TWT 2). In some embodiments, the beacon frame 841 may include one or more QTP elements or quiet elements corresponding to the QTPs determined during the QTP procedure (e.g., QTPs configured in SPs of TWT 2). The device 802 may maintain the negotiated timing coordination across the two links (e.g., interlink 805 and intralink 807) and can manage traffic buffers to communicate traffic according to the configured/ negotiated TWT schedules. The device 802 may switch between SPs of TWT 1 (e.g., SPs 810-1, 810-2) and SPs of TWT 2 (e.g., SP 820-1) to serve different links on different channels and/or at non-overlaping time periods. For example, the device 802 may communicate with the UE1 803 during the TWT 2 SP 820-1 and communicate with the AP 801 during the TWT 1 SPs 810-1, 810-2.

Figure 9:
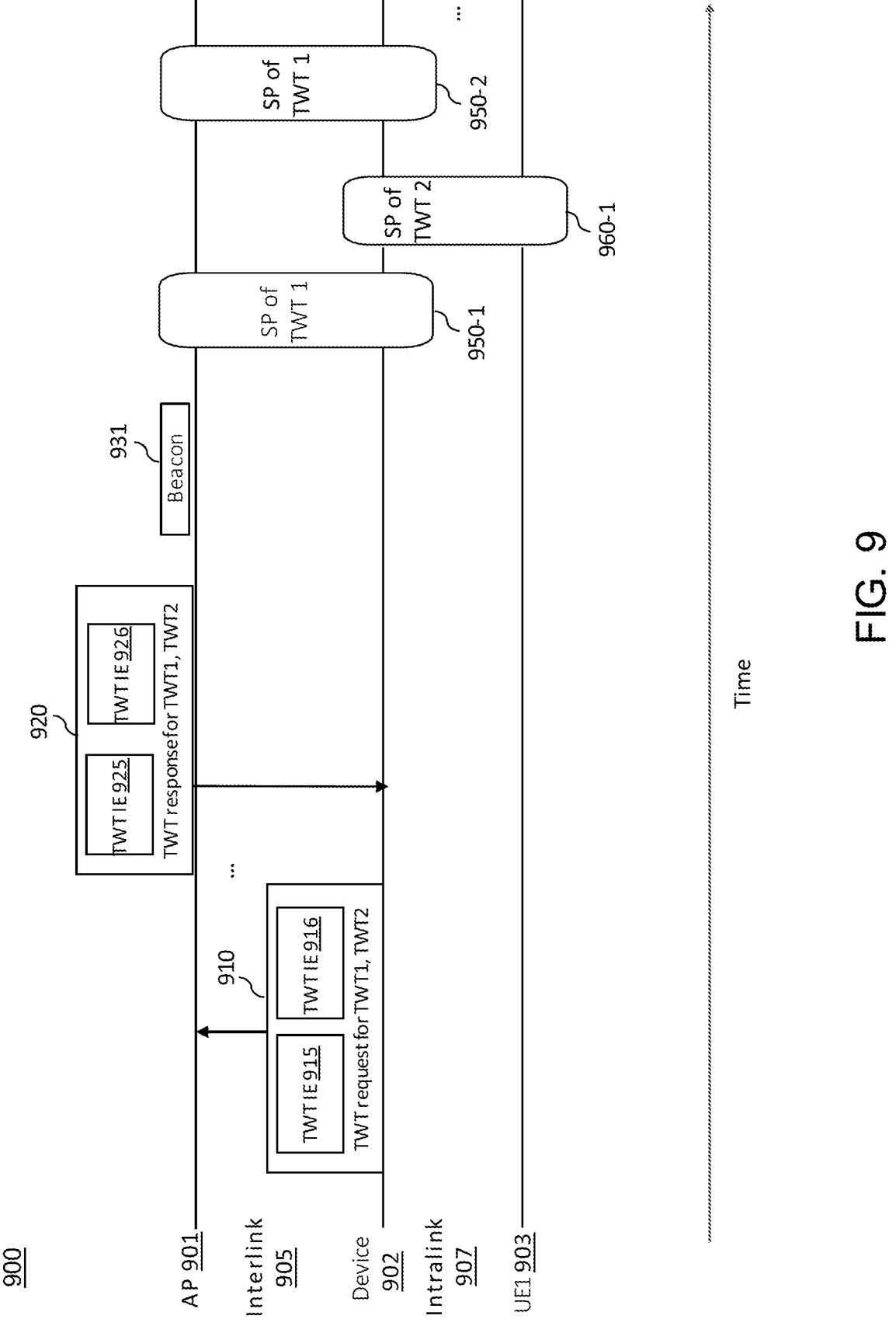
FIG. 9 is a timing diagram showing another example procedure for setting up multiple TWT schedules for inter-link traffic and intralink traffic using a single TWT setup request/response frame, according to an example implementation of the present disclosure.

FIG. 9 is a timing diagram showing another example procedure 900 for setting up multiple TWT schedules for interlink traffic (e.g., traffic over an interlink 905) and intralink traffic (e.g., traffic over an intralink 907) using a single TWT setup request/response frame, according to an example implementation of the present disclosure. Referring to FIG. 9, an AP 901, a device 902, and a UE1 903 may be wirelessly connected/communicated in a manner similar to that of the AP 501, the device 502, and the UE1 503 as shown in FIG. 5. A TWT negotiation may be employed to configure multiple TWT schedules (e.g., TWT 1 and TWT 2) using a single TWT request frame (e.g., TWT request frame 910) and/or a single TWT response frame (e.g., TWT response frame 920). In some embodiments, the device 902 may send the single TWT request frame 910 to the AP 901 with requests for TWT 1 and TWT 2. The single TWT request frame 910 may include TWT information elements (TWT IEs) 915, 916 corresponding to the requested TWT 1 and TWT 2, respectively. The AP 901 may respond with the single TWT response frame 920 accepting (or modifying/ rejecting) the requests for TWT 1 and TWT 2. The single TWT response frame 920 may include TWT IEs 925, 926 corresponding to the accepted (or modified/rejected) TWT 1 and the accepted (or modified/rejected) TWT 2. In some embodiments, one or more bits/fields in a frame format of the TWT request frame 910 or the TWT response frame 920 (or other frames/information elements) may be modified/ repurposed/added to indicate that multiple TWT schedules (e.g., TWT 1 and TWT 2) are being configured in a single TWT request frame or a single TWT response frame.

In some embodiments, a TWT negotiation between the AP 901 and the device 902 may continue until there is an agreement between the AP 901 and the device 902. For example, during a TWT negotiation, the AP may accept one TWT schedule (e.g., TWT 1) and reject/modify a different TWT schedule (e.g., TWT 2) in a single TWT response frame, and the AP and the device may continue the negotiation until there is an agreement with both TWT schedules. Once the negotiation completes, the AP may advertise the negotiated TWT schedules (e.g., TWT 1 and TWT 2) in one or more beacon frames (e.g., beacon 931). In some embodiments, the beacon frame 931 may include one or more TWT elements (e.g., TWT IEs) corresponding to the TWT schedules that have been negotiated, thereby causing nearby devices (e.g., UE2 504 associated with the AP as shown in FIG. 5) to communicate (e.g., only) during their respective SPs of the TWT schedules identified in the beacon frame 931 (e.g., TWT 1 and TWT 2). The device 902 may maintain the negotiated timing coordination across the two links (e.g., interlink 905 and intralink 907) and can manage traffic buffers to communicate traffic according to the configured/ negotiated TWT schedules. The device 902 may switch between SPs of TWT 1 (e.g., SPs 950-1, 950-2) and SPs of TWT 2 (e.g., SP 960-1) to serve different links on different channels and/or at non-overlaping time periods. For example, the device 902 may communicate with the UE1 903 during the TWT 2 SP 960-1 and communicate with the AP 901 during the TWT 1 SPs 950-1, 950-2.

In some embodiments, the procedure 900 may be modified to use an indication of P2P traffic in frames as shown in FIG. 7. For example, an indication of P2P traffic may be included in TWT IE 916 and/or TWT IE 926. In some embodiments, the procedure 900 may be modified to use a QTP procedure as shown in FIG. 8. For example, the device 902 may send to the AP 901 a QTP request frame requesting for configuring QTPs during the SPs of the TWT 2, and in response, the AP 901 may broadcast a QTP response announcing that the QTP procedure/request has been permitted.

FIG. 10 is a flowchart showing a process of coordinating traffic on multiple links, according to an example implementation of the present disclosure. In some embodiments, the process 1000 can be performed by a first device (e.g., devices 110A, 110B, 502, 602, 702, 802, 902). In some embodiments, the process 1000 is performed by other entities. In some embodiments, the process 1000 includes more, fewer, or different steps (and/or in any order) than shown in FIG. 10.

In one approach, the first device (e.g., device 602) may generate 1002 one or more request frames (e.g., request frames 611, 621) including a request for a first TWT schedule (e.g., TWT 1) and a second TWT schedule (e.g., TWT 2). In some embodiments, the first device (e.g., device 702) may set a subfield of the one or more request frames (e.g., the "P2P" subfield 722 of the TWT request frame 721) to a value indicating that the second TWT schedule is used for peer-to-peer (P2P) communication.

In one approach, the first device (e.g., device 602) may wirelessly transmit 1004 over a wireless local area network (WLAN), the generated one or more request frames (e.g., request frames 611, 621) to the AP (e.g., AP 601). In some embodiments, the first device (e.g., device 802) may generate the one or more request frames (e.g., QTP request frame 831) to cause the AP (e.g., AP 801) to configure one or more quiet time periods (QTPs) during the SP of the second TWT schedule (e.g., SP 820-1 of TWT 2).

In some embodiments, the first device may generate the one or more request frames to cause the AP to halt/stop/ skip/defer/avoid transmission of traffic to the first device during the SP of the second TWT schedule. For example, referring to FIG. 7, the first device 702 may set the "P2P" subfield 722 of the TWT request frame 721 to a value (e.g., value 1) indicating to the AP 701 that TWT 2 is used for P2P communication so that the AP 701 does not transmit any DL frames to the device 702 during SPs of TWT 2 (e.g., SP 720-1) and TWT 2 can be protected from the AP's DL traffic. Referring to FIG. 8, the first device (e.g., device 802) may generate the one or more request frames (e.g., QTP request frame 831) to cause the AP (e.g., AP 801) to configure one or more quiet time periods (QTPs) during the SP of the second TWT schedule (e.g., SP 820-1 of TWT 2) so that the AP 801 does not transmit any DL frames to the device 802 during SPs of TWT 2 and TWT 2 can be protected from the AP's DL traffic.

In some embodiments, the one or more request frames may be a single TWT request frame (e.g., TWT request frame 910) in which one or more bits are set to a value indicating a plurality of TWT schedules (e.g., TWT 1 and TWT 2) are configured in the single TWT request frame 910. In some embodiments, the first device (e.g., device 902) may receive a single TWT response frame (e.g., TWT response frame 920) in which one or more bits are set to a value indicating that a plurality of TWT schedules (e.g., TWT 1 and TWT 2) are configured in the single TWT response frame 920. The first device may determine, from the single TWT response frame 920, that the AP (e.g., AP 901) has accepted one of the first TWT schedule and the second TWT schedule and has rejected another one of the first TWT schedule and the second TWT schedule. In response to the determining, the first device may generate one or more modified request frames (e.g., a single TWT request frame) including a request for a modified TWT schedule to replace the rejected TWT schedule and wirelessly transmit the generated one or more modified request frames to the AP. In response to receiving from the AP one or more response frames (e.g., a single TWT response frame) accepting the request for the modified TWT schedule, the first device may communicate with the AP or the second device during an SP of the modified TWT schedule.

In one approach, in response to receiving from the AP (e.g., AP 601) one or more response frames accepting the request (e.g., TWT response frames 615, 625), the first device (e.g., device 602) may communicate (i) with the AP 601 during a service period (SP) of the first TWT schedule (e.g., TWT 1 SP 610-1, 610-2), and (ii) with a second device (e.g., UE1 603) during an SP of the second TWT schedule (e.g., TWT 2 SP 620-1). In some embodiments, the first device may communicate with the second device during the SP of the second TWT schedule over a peer-to-peer (P2P) link (e.g., P2P link or intralink 607). In some embodiments, the communication during the SP of the first TWT schedule (e.g., TWT 1 SP 610-1, 610-2) and the communication during the SP of the second TWT schedule (e.g., TWT 2 SP 620-1) may be performed over respective links (e.g., interlink 605 and intralink 607) on different channels or at non-overlapping time periods.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A first device comprising:
one or more processors configured to:
  generate one or more request frames including a request for a first target wake time (TWT) schedule and a second TWT schedule; and
  wirelessly transmit, via a transmitter over a wireless local area network (WLAN), the generated one or more request frames to an access point (AP); and
  in response to receiving from the AP one or more response frames accepting the request for the first TWT schedule and the second TWT schedule, communicate (i) with the AP during a service period (SP) of the first TWT schedule and (ii) with a second device during an SP of the second TWT schedule,
  wherein the one or more response frames are a single response frame.

2. The first device according to claim 1, wherein the one or more processors are configured to communicate with the second device during the SP of the second TWT schedule over a peer-to-peer (P2P) link.

3. The first device according to claim 1, wherein the communication during the SP of the first TWT schedule and the communication during the SP of the second TWT schedule are performed over respective links on different channels or at non-overlapping time periods.

4. The first device according to claim 1, wherein the one or more processors are configured to generate the one or more request frames to cause the AP to halt transmission of traffic to the first device during the SP of the second TWT schedule.

5. The first device according to claim 1, wherein the one or more processors are configured to set a subfield of the one or more request frames to a value indicating that the second TWT schedule is used for peer-to-peer (P2P) communication.

6. The first device according to claim 1, wherein the one or more processors are configured to generate the one or more request frames to cause the AP to configure one or more quiet time periods (QTPs) during the SP of the second TWT schedule.

7. The first device according to claim 1, wherein the one or more request frames are a single TWT request frame in which one or more bits are set to a value indicating a plurality of TWT schedules are configured in the single TWT request frame.

8. The first device according to claim 1, wherein the one or more processors are configured to receive the single response, wherein the single response is a single TWT response frame in which one or more bits are set to a value indicating that a plurality of TWT schedules are configured in the single TWT response frame.

9. The first device according to claim 8, wherein the one or more processors are configured to:
  determine, from the single TWT response frame, that the AP has accepted one of the first TWT schedule and the second TWT schedule and has rejected another one of the first TWT schedule and the second TWT schedule; and in response to the determining, generate one or more modified request frames including a request for a modified TWT schedule to replace the rejected TWT schedule and wirelessly transmit the generated one or more modified request frames to the AP.

10. The first device according to claim 9, wherein the one or more processors are configured to:

in response to receiving from the AP one or more response frames accepting the request for the modified TWT schedule, communicate with the AP or the second device during an SP of the modified TWT schedule.

11. A method comprising:

generating, by a first device, one or more request frames including a request for a first target wake time (TWT) schedule and a second TWT schedule; and wirelessly transmitting, by the first device over a wireless local area network (WLAN), the generated one or more request frames to an access point (AP); and in response to receiving from the AP one or more response frames accepting the request for the first TWT schedule and the second TWT schedule, communicating, by the first device, (i) with the AP during a service period (SP) of the first TWT schedule, and (ii) with a second device during an SP of the second TWT schedule, wherein the one or more response frames are a single response frame.

12. The method according to claim 11, wherein the first device communicates with the second device during the SP of the second TWT schedule over a peer-to-peer (P2P) link.

13. The method according to claim 11, wherein the communication during the SP of the first TWT schedule and the communication during the SP of the second TWT schedule are performed over respective links on different channels or at non-overlapping time periods.

14. The method according to claim 11, wherein the first device generates the one or more request frames to cause the AP to halt transmission of traffic to the first device during the SP of the second TWT schedule.

15. The method according to claim 11, further comprising:

setting a subfield of the one or more request frames to a value indicating that the second TWT schedule is used for peer-to-peer (P2P) communication.

16. The method according to claim 11, wherein the first device generates the one or more request frames to cause the AP to configure one or more quiet time periods (QTPs) during the SP of the second TWT schedule.

17. The method according to claim 11, wherein the one or more request frames are a single TWT request frame in which one or more bits are set to a value indicating a plurality of TWT schedules are configured in the single TWT request frame.

18. The method according to claim 11, comprising:

receiving the single response, wherein the single response is a single TWT response frame in which one or more bits are set to a value indicating that a plurality of TWT schedules are configured in the single TWT response frame.

19. The method according to claim 18, comprising:

determining, from the single TWT response frame, that the AP has accepted one of the first TWT schedule and the second TWT schedule and has rejected another one of the first TWT schedule and the second TWT schedule; and in response to the determining, generating one or more modified request frames including a request for a modified TWT schedule to replace the rejected TWT schedule and wirelessly transmitting the generated one or more modified request frames to the AP.

20. The method according to claim 19, comprising:

in response to receiving from the AP one or more response frames accepting the request for the modified TWT schedule, communicating with the AP or the second device during an SP of the modified TWT schedule.

* * * * *